(12) United States Patent
Bergström et al.

(10) Patent No.: US 11,968,737 B2
(45) Date of Patent: *Apr. 23, 2024

(54) ACTIVE TIME HANDLING WITH 2-STEP GRANTING

(71) Applicant: TELEFONAKTIEBOLAGET LM ERICSSON (PUBL), Stockholm (SE)

(72) Inventors: Mattias Bergström, Sollentuna (SE); Riikka Susitaival, Helsinki (FI)

(73) Assignee: TELEFONAKTIEBOLAGET ERICSSON (PUBL), Stockholm (SE)

( * ) Notice: Subject to any disclaimer, the term of this patent is extended or adjusted under 35 U.S.C. 154(b) by 34 days.

This patent is subject to a terminal disclaimer.

(21) Appl. No.: 17/330,190

(22) Filed: May 25, 2021

(65) Prior Publication Data

US 2021/0352759 A1 Nov. 11, 2021

Related U.S. Application Data

(63) Continuation of application No. 16/338,393, filed as application No. PCT/IB2017/055539 on Sep. 13, 2017, now Pat. No. 11,019,676.

(60) Provisional application No. 62/401,222, filed on Sep. 29, 2016.

(51) Int. Cl.
*H04W 76/28* (2018.01)
*H04W 72/21* (2023.01)
*H04W 72/23* (2023.01)
*H04W 76/27* (2018.01)

(52) U.S. Cl.
CPC ........... *H04W 76/28* (2018.02); *H04W 72/21* (2023.01); *H04W 72/23* (2023.01); *H04W 76/27* (2018.02)

(58) Field of Classification Search
CPC .............. H04W 76/28; H04W 72/042; H04W 72/1284; H04W 72/14; H04W 76/27; H04W 72/1289; Y02D 30/70
See application file for complete search history.

(56) References Cited

U.S. PATENT DOCUMENTS 8,265,682 B2 * 9/2012 Bertrand ........... H04W 52/0225
370/318
10,356,778 B2 * 7/2019 Tseng ................. H04W 52/143
10,420,165 B2 * 9/2019 Dinan ................. H04W 52/365
(Continued)

FOREIGN PATENT DOCUMENTS

CN 103733717 A 4/2014
CN 104737479 A 6/2015
(Continued)

OTHER PUBLICATIONS

"6 Random Access Procedure", 3GPP TS 36.213 V14.0.0, Release 14, Sep. 2016.
(Continued)

*Primary Examiner* — Jay P Patel

(57) ABSTRACT

A wireless communications device, operating according to a DRX configuration and configured to receive two-step grants for uplink transmissions, determines whether the device has received a first trigger of a two-step grant. The device enters a state in which the device listens on a physical downlink control channel for messages from the network, in response to determining that the device has received the first trigger, without necessarily receiving the second trigger.

20 Claims, 14 Drawing Sheets

(56) References Cited

U.S. PATENT DOCUMENTS

| | | | |
|---|---|---|---|
| 11,102,840 B2* | 8/2021 | Dinan | H04W 48/12 |
| 2009/0239568 A1* | 9/2009 | Bertrand | H04W 52/0225 455/522 |
| 2009/0247203 A1 | 10/2009 | Kuo | |
| 2012/0275364 A1 | 11/2012 | Anderson et al. | |
| 2013/0122913 A1* | 5/2013 | Agarwal | H04W 72/04 455/439 |
| 2014/0233457 A1 | 8/2014 | Koutsimanis et al. | |
| 2014/0313908 A1 | 10/2014 | Da Silva et al. | |
| 2015/0296534 A1 | 10/2015 | Han | |
| 2016/0119895 A1 | 4/2016 | Agiwal et al. | |
| 2016/0119969 A1* | 4/2016 | Vajapeyam | H04W 72/0453 370/329 |
| 2017/0041981 A1 | 2/2017 | Kela et al. | |
| 2017/0332377 A1* | 11/2017 | Tseng | H04L 5/0053 |
| 2018/0077643 A1* | 3/2018 | Dinan | H04W 76/27 |
| 2018/0077644 A1* | 3/2018 | Dinan | H04W 52/0216 |
| 2018/0092051 A1* | 3/2018 | Dinan | H04W 52/365 |
| 2018/0092071 A1* | 3/2018 | Dinan | H04L 1/1812 |
| 2018/0092072 A1* | 3/2018 | Babaei | H04L 5/0053 |
| 2018/0092073 A1* | 3/2018 | Nogami | H04W 52/54 |
| 2018/0110084 A1* | 4/2018 | Dinan | H04W 76/28 |
| 2018/0146465 A1 | 5/2018 | Li et al. | |
| 2019/0081757 A1 | 3/2019 | Yang et al. | |
| 2019/0110190 A1 | 4/2019 | Van Lieshout et al. | |
| 2019/0150018 A1 | 5/2019 | Song et al. | |
| 2019/0174554 A1* | 6/2019 | Deenoo | H04L 5/0048 |
| 2019/0208535 A1 | 7/2019 | Bergström et al. | |
| 2019/0223035 A1 | 7/2019 | You et al. | |
| 2019/0238279 A1* | 8/2019 | Tiirola | H04L 1/1887 |
| 2019/0239171 A1 | 8/2019 | Ahn et al. | |
| 2019/0320467 A1* | 10/2019 | Freda | H04W 74/004 |
| 2020/0008262 A1* | 1/2020 | Dinan | H04W 76/28 |
| 2020/0053707 A1* | 2/2020 | Babaei | H04L 5/0091 |
| 2020/0374800 A1* | 11/2020 | Dinan | H04W 72/1273 |
| 2021/0345445 A1* | 11/2021 | Dinan | H04W 52/0216 |

FOREIGN PATENT DOCUMENTS

| | | |
|---|---|---|
| CN | 102281502 B | 7/2016 |
| RU | 2014128626 A | 2/2016 |
| RU | 2586073 C2 | 6/2016 |
| WO | 2012174327 A1 | 12/2012 |
| WO | 2015174327 A1 | 11/2015 |

OTHER PUBLICATIONS

3GPP, "3rd Generation Partnershi Project; Technical Specification Group Radio Access Network; Evolved Universal Terrestrial Radio Access (E-UTRA); Medium Access Control (MAC) protocol specification (Release 13)" TS 36.321 V13.2.0. Jun. 2016.

Ericsson, "DRX and 2-step granting", 3GPP TSG-RAN WG2 #95bis; Tdoc R2-166713, Oct. 10-14, 2016.

Ericsson, "DRX and 2-step granting", 3GPP TSG-RAN WG2 #95bis; Tdoc R2-166714, Oct. 10-14, 2016.

Ericsson, "Report from [95bis#07][LTE/eLAA] MAC impact of 2 step granting", 3GPP TSG-RAN WG2 #96; Tdoc R2-168362, Nov. 14-18, 2016.

Nokia et al., "On Two-Stage UL scheduling for eLAA", 3GPP TSG RAN WG1 Meeting #86, R1-167074, Aug. 22-26, 2016.

Nokia et al., "UL support for LAA SCells", 3GPP TSG-RAN WG2 Meeting #93bis, R2-162669, Apr. 11-15, 2016.

Samsung, "Discussion on two-step UL grant scheduling", 3GPP TSG RAN WG1 Meeting #86, R1-166691, Aug. 22-26, 2016.

* cited by examiner

ACTIVE TIME HANDLING WITH 2-STEP GRANTING

RELATED APPLICATIONS

This application is a continuation application of U.S. patent application Ser. No. 16/338,393, filed Mar. 29, 2019, granted as U.S. Pat. No. 11,019,676 on May 25, 2021, which is a national stage application of International Patent Application No. PCT/IB2017/055539, filed Sep. 13, 2017, which claims the benefit of U.S. provisional patent application Ser. No. 62/401,222, filed Sep. 29, 2016, the disclosures of which are hereby incorporated herein by reference in their entirety.

TECHNICAL FIELD

The present disclosure relates generally to wireless communications, and more particularly to a wireless communications device operating according to a Discontinuous Reception (DRX) configuration and configured to receive, from a wireless communications network, two-step grants for uplink transmissions.

BACKGROUND

A user equipment (UE) may be configured with different discontinuous reception (DRX) configurations to save battery power. When the UE is in DRX sleep, the UE does not need to listen on a physical downlink control channel (e.g., PDCCH). When the UE is in DRX Active Time, the UE must normally listen on the PDCCH channel to wait for potential scheduling requests from the eNodeB (eNB).

The UE is in DRX active time when any of the conditions specified in section 5.7 in the MAC standard (3GPP TS 36.321 v13.2.0) is true and are summarized as:
1. DRX parameters are not configured; or
2. DRX parameters are configured and
2.1 drx-InactivityTimer is running; or
2.2 drx-RetransmissionTimer is running; or
2.3 mac-ContentionResolutionTimer is running; or
2.4 a Scheduling Request sent on PUCCH is pending; or
2.5 an uplink grant for a pending HARQ retransmission can occur and there is data in the corresponding HARQ buffer; or
2.6 a PDCCH indicating a new transmission addressed to the C-RNTI of the UE has not been received after successful reception of a Random Access Response for the explicitly signaled preamble (only applicable to UEs in RRC_CONNECTED).
Otherwise
3 It is the state when DRX sleep is used.
DRX Cycles and the drx-Inactivity Timer A UE in RRC_CONNECTED state and configured with the DRX function can be configured with both a long and a short DRX cycle. The intention with the long DRX cycle is that the UE should be able to sleep for a long time and only wake up within DRX active time periodically, to listen for any new scheduling requests. The intention with the short DRX cycle is that the UE should be awake more frequently than in long DRX cycle to listen for any scheduling requests. The time periods that the UE is awake to listen for scheduling requests is called OnDuration periods, and is configured for a certain time duration that the UE shall be awake.

When the UE is scheduled, the drx-InactivityTimer is started and while this timer is running the UE is awake to listen for any scheduling requests. When the drx-InactivityTimer expires, the UE will enter a short DRX sleep, if configured. Otherwise, the UE will enter a long DRX sleep. Also, if the UE has not been scheduled for a configured number of short DRX cycles, the UE will enter a long DRX sleep.
Two-Step Grant Framework In Long-Term Evolution (LTE), the eNB provides uplink transmission grants to the UE via PDCCH signaling. If the UE receives an uplink transmission grant via PDCCH in transmission time interval (TTI) N, the UE performs the associated PDCCH transmission in TTI N+4.

In Rel-14 of LTE, a two-step granting framework was introduced. According to the two-step scheduling framework, the UE can be scheduled using two PDCCH messages, where the combination of the two messages grants that the UE can perform an uplink transmission. In this framework, the UE first receives a PDCCH transmission that indicates a first trigger (sometimes referred to as "Step 1", or "physical uplink shared channel (PUSCH) trigger A"), which has an associated second trigger (sometimes referred to as "Step 2", or "PUSCH trigger B") that is transmitted in a second PDCCH transmission.

Below is an excerpt from a 3GPP CR for 36.213 that describes the two-step grant framework:
For a serving cell that is a LAA SCell, a UE shall
upon detection of an PDCCH/EPDCCH with DCI format 0A/0B/4A/4B and with 'PUSCH trigger A' field set to '0' in subframe n intended for the UE, or
upon detection of PDCCH/EPDCCH with DCI format 0A/0B/4A/4B and with 'PUSCH trigger A' field set to '1' in the most recent subframe from subframe n-v intended for the UE, and upon detection of PDCCH with DCI CRC scrambled by CC-RNTI and with 'PUSCH trigger B' field set to '1' in subframe n
perform a corresponding PUSCH transmission, conditioned on the channel access procedures described in clause 15.2.1, in subframe(s) n+l+k+i with i=0, 1, . . . , N−1 according to the PDCCH/EPDCCH and HARQ process ID mod($n_{HARQ\_ID}$+i, $N_{HARQ}$), where
N=1 for DCI format 0A/4A, and value of N is determined by the 'number of scheduled subframes' field in the corresponding DCI format 0B/4B.
The UE is configured the maximum value of N by higher layer parameter maxNumberOfSchedSubframes-Format0B for DCI format 0B and higher layer parameter maxNumberOfSchedSubframes-Format4B for DCI format 4B;
value of k is determined by the scheduling delay field in the corresponding DCI 0A/0B/4A/4B according to Table 8.2d if 'PUSCH trigger A' field set to '0' or Table 8.2e otherwise;
value of $n_{HARQ\_ID}$ is determined by the HARQ process number field in the corresponding DCI format 0A/0B/4A/4B and $N_{HARQ}$=16;
for 'PUSCH trigger A' field set to '0' in the corresponding DCI format 0A/0B/4A/4B,
l=4
otherwise
value of 1 is the UL offset as determined by the 'UL configuration for LAA' field in the corresponding DCI with CRC scrambled by CC-RNTI according to the procedure in subclause 13A, and 'PUSCH trigger B' field set to '1',
value of v is determined by the validation duration field in the corresponding PDCCH/EPDCCH with DCI format 0A/0B/4A/4B according to Table 8.2f, and 'PUSCH trigger A' field set to '1' the smallest value of l+k supported by the UE is included in the UE-EUTRA-Capability TABLE 8.2d k for DCI format 0A/0B/4A/4B with
'PUSCH trigger A' field set to '0'.

| Value of 'scheduling delay' field | k |
| --- | --- |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

TABLE 8.2e k for DCI format 0A/0B/4A/4B with
'PUSCH trigger A' field set to '1'.

| Value of 'schedule delay' field | k |
| --- | --- |
| 00 | 0 |
| 01 | 1 |
| 10 | 2 |
| 11 | 3 |

TABLE 8.2f v for DCI format 0A/0B/4A/4B with
'PUSCH trigger A' field set to '1'.

| Value of 'validation duration' field | v |
| --- | --- |
| 00 | 8 |
| 01 | 12 |
| 10 | 16 |
| 11 | 20 |

As explained above, according to the two-step granting framework, the UE receives two messages, which in combination determines when the UE should perform the uplink transmission.

In the current DRX framework in LTE, the UE starts an inactivity timer for when the UE will be in Active Time (or "awake") when PDCCH indicates an uplink transmission. In the scenario where two-step granting is applied, this would result in the UE staying awake only when the UE has received Step 2, since before receiving Step 2, the UE has not yet received the actual grant. This can thus result in the UE not being in Active Time and hence not monitoring PDCCH. The UE could therefore not be reached by the eNB.

SUMMARY

Embodiments of this disclosure describe a UE that can be in Active Time during a time prior to when the UE has received a complete grant. That is, the UE can be in Active Time before Step 2 when two-step granting is used. This allows the eNB to send messages to the UE via the PDCCH, even though a complete grant has not been provided to the UE. This can improve user throughput and system performance Active Time may include when the UE is in a state in which the UE listens on a physical downlink control channel for messages from the network.

According to some embodiments, a method is performed by a wireless communications device operating according to a DRX configuration and configured to receive, from a wireless communications network, two-step grants for uplink transmissions. The method includes determining whether the device has received a first trigger of a two-step grant and entering a state in which the device listens on a physical downlink control channel for messages from the network, in response to determining that the device has received the first trigger.

According to some embodiments, a wireless communications device configured to operate according to a DRX configuration and configured to receive, from a wireless communications network, two-step grants for uplink transmissions, includes transceiver circuitry configured for communication with the network and processing circuitry operatively associated with the transceiver circuitry. The processing circuitry is configured to determine whether the device has received a first trigger of a two-step grant and cause the device to enter a state in which the device listens on a physical downlink control channel for messages from the network, in response to determining that the device has received the first trigger.

According to some embodiments, a method is performed by a network node of a wireless communications network, where the network node is configured to provide, to a wireless communications device operating according to a DRX configuration, two-step grants for uplink transmissions. The method includes transmitting a first trigger of the two-step grant and prior to transmitting a second trigger of the two-step grant, transmitting physical downlink control channel messages to the device to be received during a state in which the device listens on a physical downlink control channel for messages from the network.

According to some embodiments, a network node of a wireless communications network, where the network node is configured to provide, to a wireless communications device operating according to a DRX configuration, two-step grants for uplink transmissions, includes transceiver circuitry configured for communication with the device and processing circuitry operatively associated with the transceiver circuitry. The processing circuitry is configured to transmit, via the transceiver circuitry, a first trigger of the two-step grant, and prior to transmitting a second trigger of the two-step grant, transmit physical downlink control channel messages to the device to be received during a state in which the device listens on a physical downlink control channel for messages from the network.

According to some embodiments, a non-transitory computer readable storage medium storing a computer program comprising program instructions that, when executed on a processing circuit of a wireless communications device configured to operate according to a DRX configuration and configured to receive, from a wireless communications network, two-step grants for uplink transmissions, cause the device to determine whether the device has received a first trigger of a two-step grant and cause the device to enter a state in which the device listens on a physical downlink control channel for messages from the network, in response to determining that the device has received the first trigger.

According to some embodiments, a non-transitory computer readable storage medium storing a computer program comprising program instructions that, when executed on a processing circuit of a network node of a wireless communications network, the network node configured to provide, to a wireless communications device operating according to a DRX configuration, two-step grants for uplink transmissions, cause the network node to transmit a first trigger of the two-step grant and prior to transmitting a second trigger of the two-step grant, transmit physical downlink control channel messages to the device to be received during a state in which the device listens on a physical downlink control channel for messages from the network.

According to some embodiments, a method performed by a wireless communications device operable to receive two-step grants. The method can include determining that the device has received a first step of a two-step grant and entering Active Time in response to said determining that the device has received the first step.

The method may further include determining that the first step became invalid, and in response to the determining, exiting Active Time. The method may also include determining that the device has received a second step, and in response to the determining, exiting Active Time.

Another embodiment of the present disclosure is directed to a wireless communications device configured to receive two-step grants. The device can include processing circuitry configured to determine that the device has received a first step of a two-step grant and exit Active Time in response to determining that the device has received the first step.

The processing circuitry may be configured to determine that the first step became invalid and, in response to the determining, exit Active Time. The processing circuitry may also be configured to determine that the device has received a second step, and, in response to the determining, exit Active Time.

Of course, various modules of hardware and software elements, alone or combination, could be used to perform the steps described herein at one or any combination of network nodes. Other advantages and features of various embodiments will become apparent to one of ordinary skill in the art, in light of the following detailed description and accompanying figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
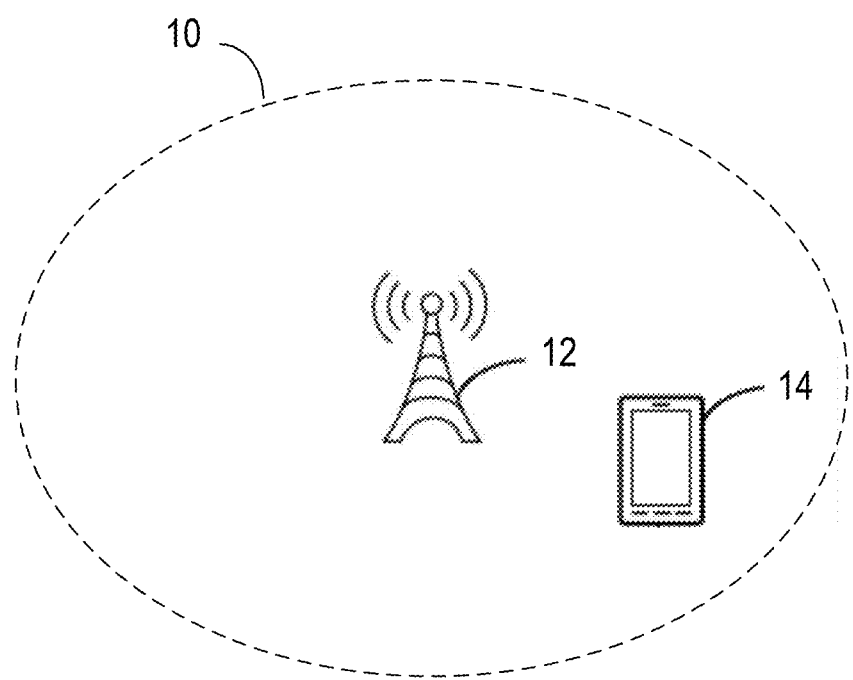
FIG. 1 illustrates a cellular communications network, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Any two or more embodiments described in this document may be combined in any way with each other. Furthermore, even though some examples herein are given in the Internet of Things (IoT) context, the embodiments described herein are not limited to IoT and can also apply in a more general case when a network node or User Equipment (UE) may need to signal or receive Cell Identity, Network Identity, and/or Frequency Hopping (FH) patterns.

In some embodiments, a non-limiting term "UE" is used. The UE herein can be any type of wireless device capable of communicating with network node or another UE over radio signals. The UE may also be a radio communication device, a target device, a Device-to-Device (D2D) UE, a machine type UE, a UE capable of Machine-to-Machine communication (M2M), a sensor equipped with UE, iPad, Tablet, mobile terminal, smart phone, Laptop Embedded Equipment (LEE), Laptop Mounted Equipment (LME), Universal Serial Bus (USB) dongle, Customer Premises Equipment (CPE), etc.

Also in some embodiments, generic terminology "network node" is used. It can be any kind of network node which may be comprised of a radio network node such as a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, Self-Organizing Network (SON) node, a coordinating node, etc.), or even an external node (e.g., 3rd party node, a node external to the current network), etc. The term "radio node" used herein may be used to denote a UE or a radio network node.

The embodiments are applicable to single carrier as well as to multicarrier or Carrier Aggregation (CA) operation of the UE in which the UE is able to receive and/or transmit data to more than one serving cells. The term Carrier Aggregation (CA) is also called (e.g. interchangeably called) "multi-carrier system," "multi-cell operation," "multi-carrier operation," "multi-carrier transmission," and/or reception. In CA, one of the Component Carriers (CCs) is the Primary Component Carrier (PCC) or simply primary carrier or even anchor carrier. The remaining ones are called Secondary Component Carrier (SCC) or simply secondary carriers or even supplementary carriers. The serving cell is interchangeably called as Primary Cell (PCell) or Primary Serving Cell (PSC). Similarly, the secondary serving cell is interchangeably called as Secondary Cell (SCell) or Secondary Serving Cell (SSC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "signal transmission" used herein may refer to a certain type of periodic signal that is transmitted by the network node in downlink or by the UE in the uplink. The signal transmission may comprise a physical signal or a physical channel or both. The physical signal does not carry higher layer information, whereas the physical channel carries higher layer information. These signals are used by the network node and/or by the UE for performing one or more operations.

FIG. 1 illustrates a cellular communications network 10 in which embodiments of the present disclosure can be implemented. In some embodiments, the cellular communications network 10 includes a Radio Access Network (RAN) (e.g., an Evolved Universal Mobile Telecommunications System (UMTS) Radio Access Network (E-UTRAN) for LTE) including at least one base station 12 (sometimes referred to herein as "network node 12") providing a cell of the cellular communications network 10. The network node 12 provides radio access to a wireless device, such as UE 14, located within the respective cell. The network node 12 may be communicatively coupled via a base station to a base station interface (e.g., an X2 interface in LTE), to another base station, or to another network node. Further, in some embodiments, the network node 12 is connected to a core network (e.g., an Evolved Packet Core (EPC) in LTE) via corresponding interfaces (e.g., S1 interfaces in LTE). The core network includes various core network nodes such as, e.g., Mobility Management Entities (MMEs), Serving Gateways (S-GWs), and Packet Data Network (PDN) Gateways (P-GWs), as will be appreciated by one of ordinary skill in the art.

Figure 2:
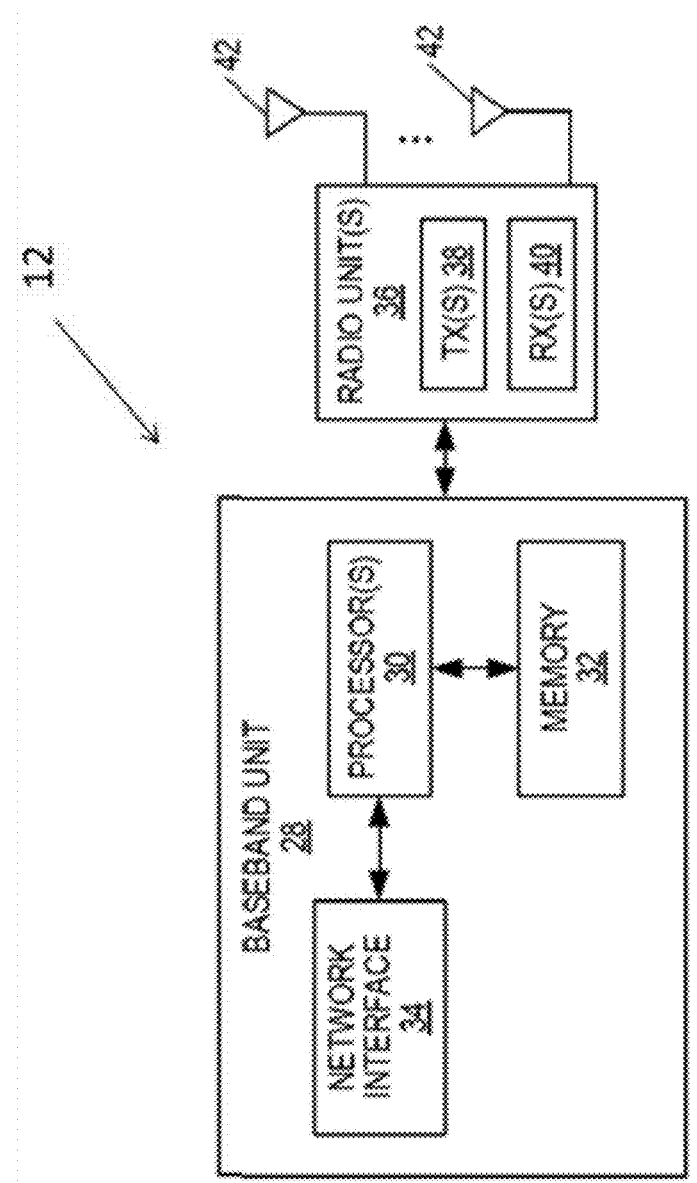
FIG. 2 is a diagram of a network node according to some embodiments.

FIG. 2 is a diagram of a network node 12 according to some embodiments of the present disclosure. In some embodiments, the network node 12 may be a base station such as an eNB. The network node 12 includes circuitry containing instructions, which when executed, cause the network node 12 to implement the methods and functionality described herein. In one example, the circuitry can include one or more processors 30 and a memory 32 containing instructions. The baseband unit 28 also includes a network interface 34. The network interface 34 may include one or more components (e.g., network interface card(s)) that connect the transmitter network node to other systems. The network node 12 also includes at least one radio unit 36 with one or more transmitters 38, one or more receivers 40, and one or more antennas 42. In some embodiments, the network node 12, or the functionality of the network node 12 described with respect to any one of the embodiments described herein, is implemented in software that is stored in, e.g., the memory 32 and executed by the processor 30.

In some embodiments, a computer program including instructions that, when executed by the at least one processor 30, causes the at least one processor 30 to carry out the functionality of the network node 12 according to any one of the embodiments described herein is provided. The processor 30 is configured to provide, to a wireless communications device operating according to a DRX configuration, two-step grants for uplink transmissions. The processor 30 is configured to transmit, via the radio unit 36, a first trigger of the two-step grant. The processing circuitry 30 is also configured to, prior to transmitting a second trigger of the two-step grant, transmit physical downlink control channel messages to the device to be received during a state in which the device listens on a physical downlink control channel for messages from the network.

The device may start a timer that controls the duration of Active Time at the device, or the duration of the time that the device is in the state. Accordingly, the processor 30 may be configured to transmit a duration of a timer to be started by the device, where the device exits the state only upon expiration of the timer. The processor 30 may also be configured to determine whether the device is configured to enter the state before receiving the second trigger.

In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 3:
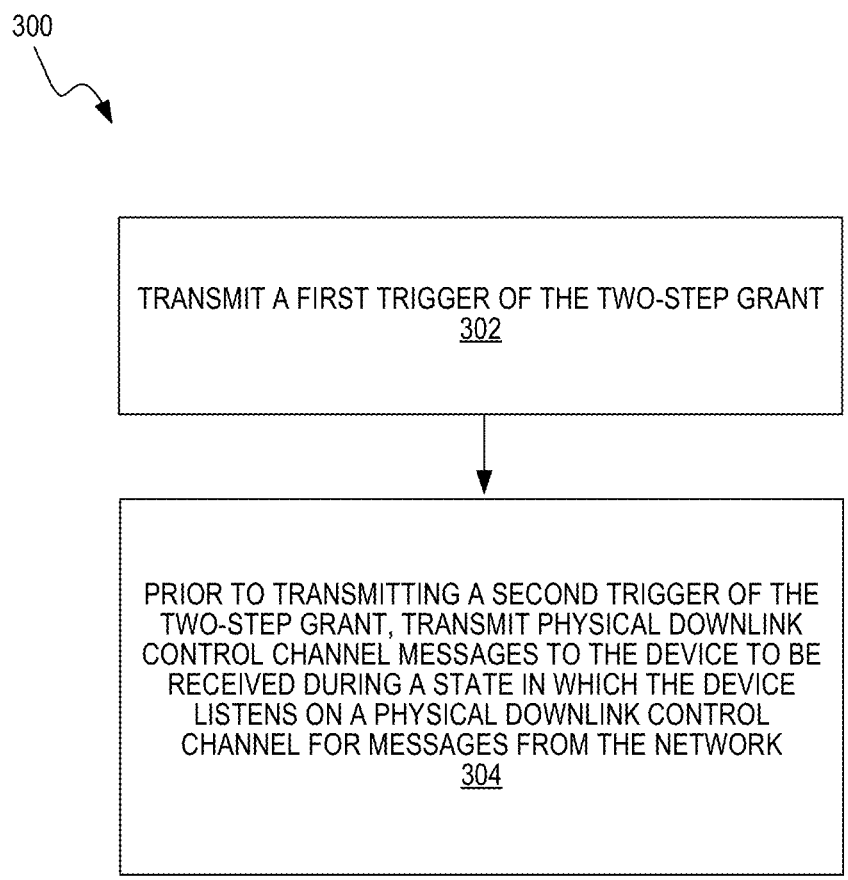
FIG. 3 is an exemplary flowchart illustrating a method by a network node, according to some embodiments.

FIG. 3 is an exemplary flowchart illustrating various functions in a method 300 performed, for example, by network node 12. The method 300 includes transmitting a first trigger of the two-step grant (block 302) and prior to transmitting a second trigger of the two-step grant, transmitting physical downlink control channel messages to the device to be received a state in which the device listens on a physical downlink control channel for messages from the network (block 304). The method 300 may then include transmitting the second trigger.

The method 300 may include transmitting a duration of a timer to be started by the device, where the device exits the state only upon expiration of the timer. In some cases, the method 300 also includes determining whether the device is configured to enter the state before receiving the second trigger.

Figure 4:
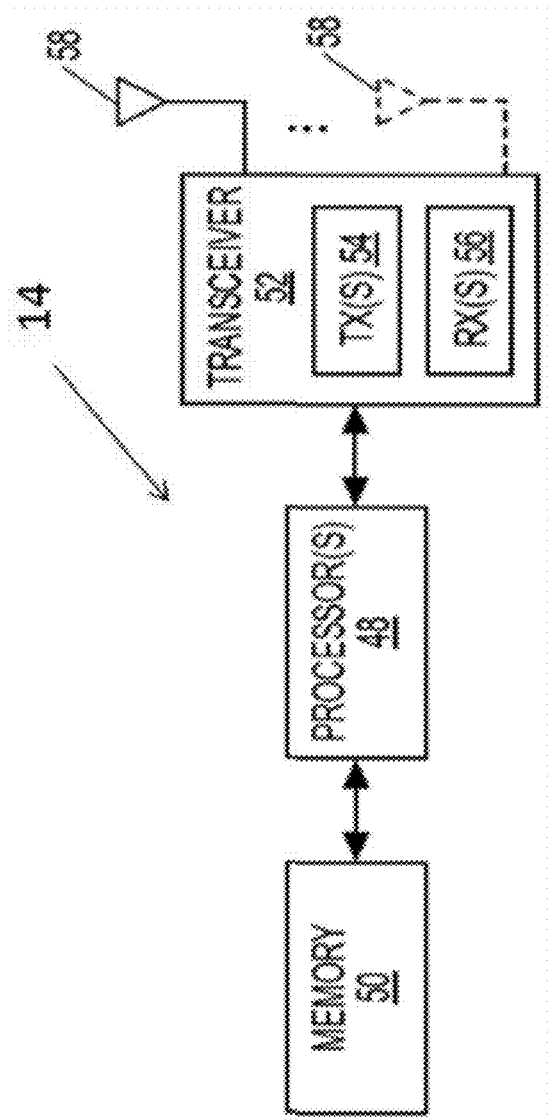
FIG. 4 is a diagram of a wireless device according to some embodiments.

FIG. 4 is a diagram of a wireless communications device, such as for UE 14, according to some embodiments. As illustrated, UE 14 includes at least one processor 48 and memory 50. The UE 14 also includes a transceiver 52 with one or more transmitters 54, one or more receivers 56, and one or more antennas 58. In some embodiments, UE 14, or the functionality of the wireless device 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the UE 14 to other systems.

In some embodiments, a computer program including instructions that, when executed by at least one processor 48, causes the at least one processor 48 to carry out the functionality of the UE 14 according to any one of the embodiments described herein is provided, including a wireless communications device configured to operate according to a DRX configuration and configured to receive, from a wireless communications network, two-step grants for uplink transmissions. The processor 48 is configured to determine whether the device has received a first trigger of a two-step grant and cause the device to enter a state in which the device listens on a physical downlink control channel for messages from the network, in response to determining that the device has received the first trigger.

In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 5:
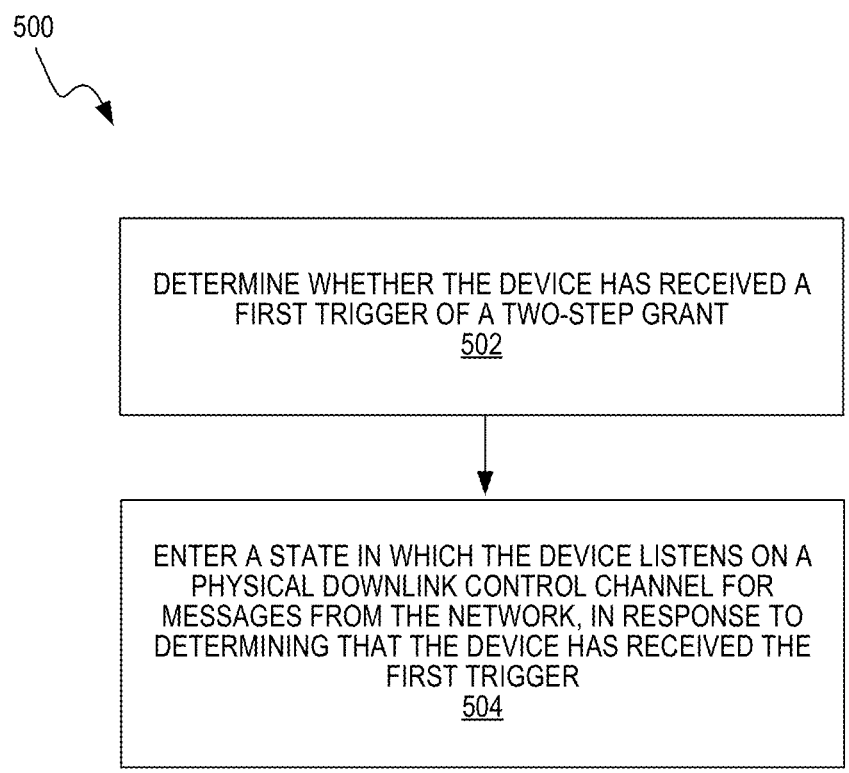
FIG. 5 is an exemplary flowchart illustrating a method by a wireless device, according to some embodiments.

FIG. 5 is an exemplary flowchart illustrating various functions in a method 500 performed, for example, by UE 14. The method includes determining whether the device has received a first trigger of a two-step grant (block 502). The method 500 also includes entering a state in which the device listens on a physical downlink control channel for messages from the network, in response to determining that the device has received the first trigger (block 504). Of course, various other network nodes, alone or in combination, or various processing units, can perform the functionality described herein.

As defined for the following embodiments, Active Time is a time during a DRX cycle or a state of the UE in which the UE listens on a physical downlink control channel for messages from the network. This may include listening on a PDCCH for scheduling requests from the network. It should be appreciated that even though the methods described above may dictate whether the UE is or is not in Active Time, there may be other mechanisms that cause the UE to enter or exit Active Time. For example, the DRX mechanism in LTE comprises different timers (e.g., the onDuration timer and the inactivity timer) and while those timers are running, the UE might stay in Active Time.

Conditions on being in Active Time

Figure 6:
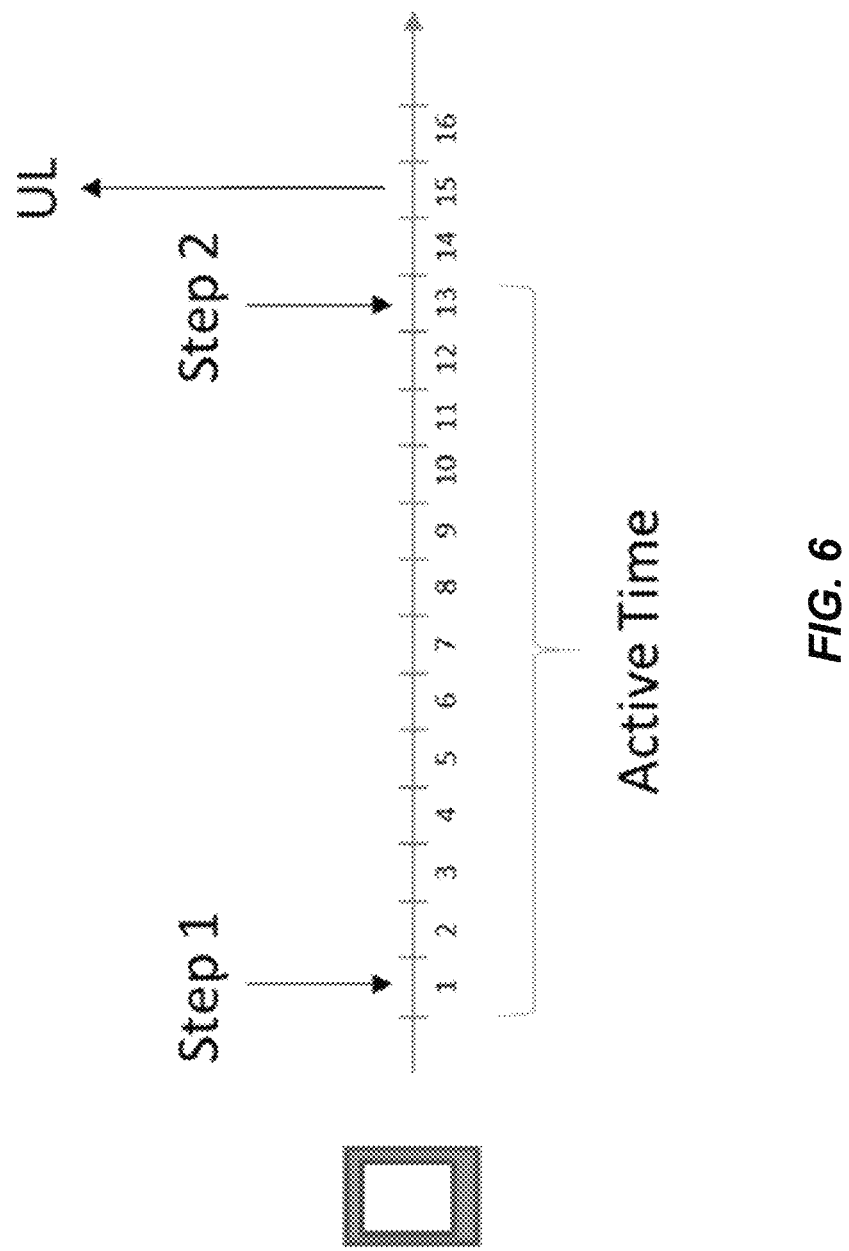
FIG. 6 illustrates a case where the UE is in Active Time from Step 1 until Step 2, according to an exemplary embodiment.

In one embodiment, the UE can be in a state in which it listens on a physical downlink control channel for messages from the network from a first trigger to a second trigger of the two-step grant. In the embodiments illustrated by FIGS. 6-12, this state is referred to as "Active Time" and the first and second triggers are referred to as Step 1 and Step 2. FIG. 6 illustrates the scenario where the UE is in Active Time from Step 1 until Step 2.

It may be so that the TTI which Step 1 and/or Step-2 are received in are either included or not included in Active Time. For example, Active Time may include the TTI in which the second trigger (Step 2) was received. Active Time may also include the TTI in which the first trigger (Step 1) was received.

Figure 7:
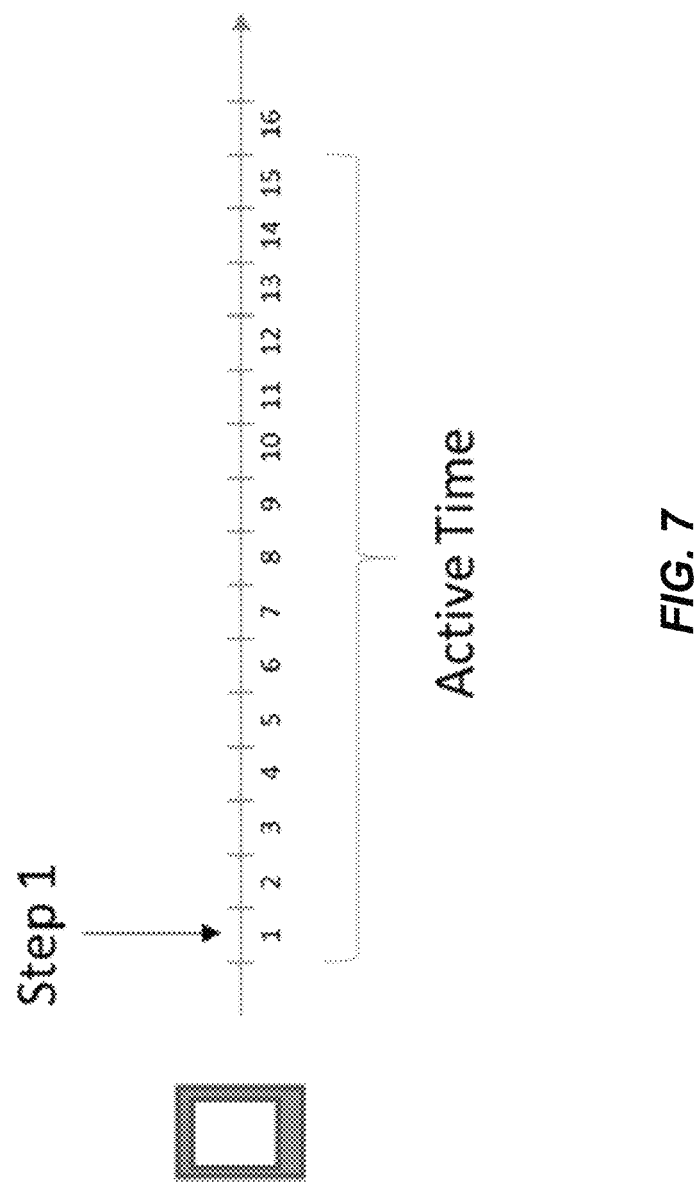
FIG. 7 illustrates a case where the UE is in Active Time from Step 1 until a certain period of time, but if Step 2 does not arrive within that period of time the UE exits Active Time, according to an exemplary embodiment.

In another embodiment, the UE will be in Active Time from the first trigger until the first trigger becomes invalid. For example, the method 500 may include determining whether the first trigger became invalid and, in response to determining that the first trigger became invalid, exiting a state in which the device listens on a physical downlink control channel for messages from the network. FIG. 7 illustrates the scenario where the UE is in Active Time from Step 1 until a certain period of time. If Step 2 does not arrive within that period of time, the UE exits Active Time. For example, this can be the case if Step 1 is valid for just a certain period of time after reception of Step 1.

In some cases, the method 500 includes starting a timer in response to receiving the first trigger and exiting the state only upon expiration of the timer. The duration of the timer may be received with the first trigger or in Radio Resource Control, RRC, signaling. In some cases, the timer is stopped in response to receiving the second trigger. In some embodiments, the device exits the state only upon expiration of the timer, which is before the second trigger has been received.

A combination of the above embodiments may be applied wherein the UE will be in the state from the first trigger to the second trigger, or until the first trigger becomes invalid. This ensures that, even though the eNB has not provided a complete grant to the UE, the UE will monitor PDCCH continuously, ensuring that the eNB can provide the second trigger, or any other PDCCH transmission to the UE.

When the UE is in the state until the second trigger, the UE considers the time when the second trigger is received/decoded. But it should be noted though that the UE may at this point in time be in Active Time for other reasons, e.g., due to that an inactivity Timer is running.

Figure 8:
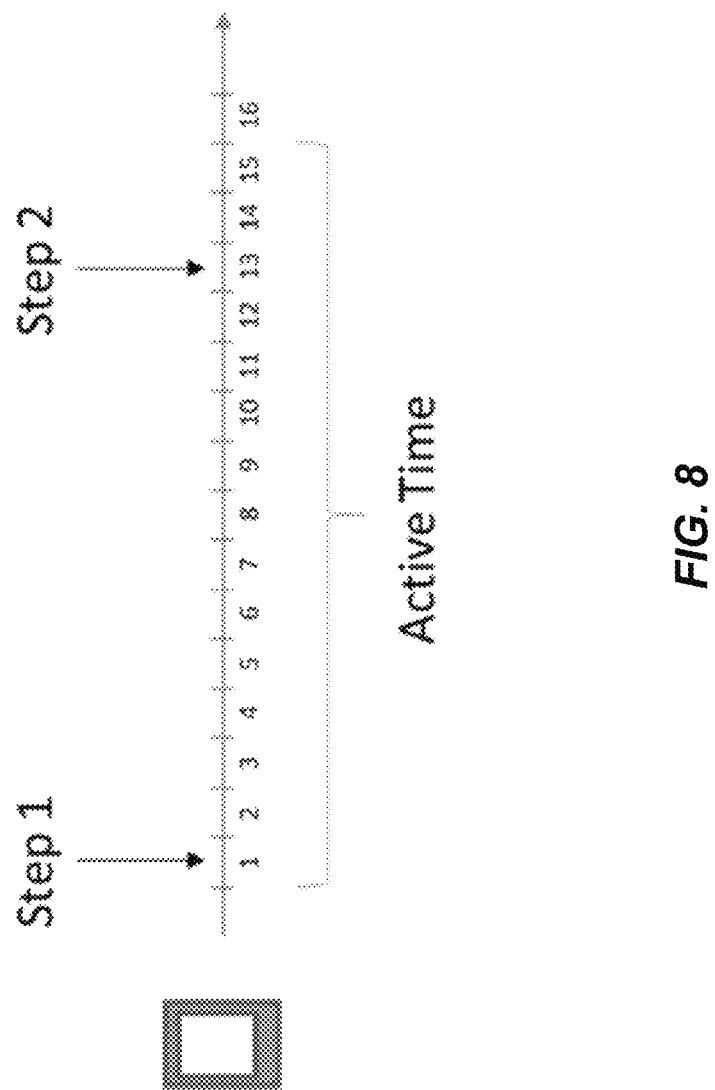
FIG. 8 illustrates a case where the UE is in Active Time after receiving Step 1, and the UE stays in Active Time, even if Step 2 is received, according to an exemplary embodiment.

Although some embodiments herein describe that the UE is in Active Time, or the UE state, from receiving the first trigger until receiving the second trigger (or until the first trigger becomes invalid), and hence that the UE "exits" Active Time in response to receiving the second trigger (or in response to the first trigger becoming invalid), the UE can remain in Active Time when the second trigger is received (or when the first trigger becomes invalid) since the timer is running FIG. 8 illustrates the scenario where the UE is in Active Time for a certain period of time after receiving Step 1, and the UE stays in Active Time for a period of time, even if Step 2 is received. The period of time may be the validity of Step 1. Accordingly, the method 500 may include determining whether the device has received the second trigger. The method 500 may also include, in response to determining that the device has received the second trigger, determining whether a particular timer is running. The method 500 then includes, in response to determining that the timer is running, exiting the state only after expiration of the timer.

Figure 9:
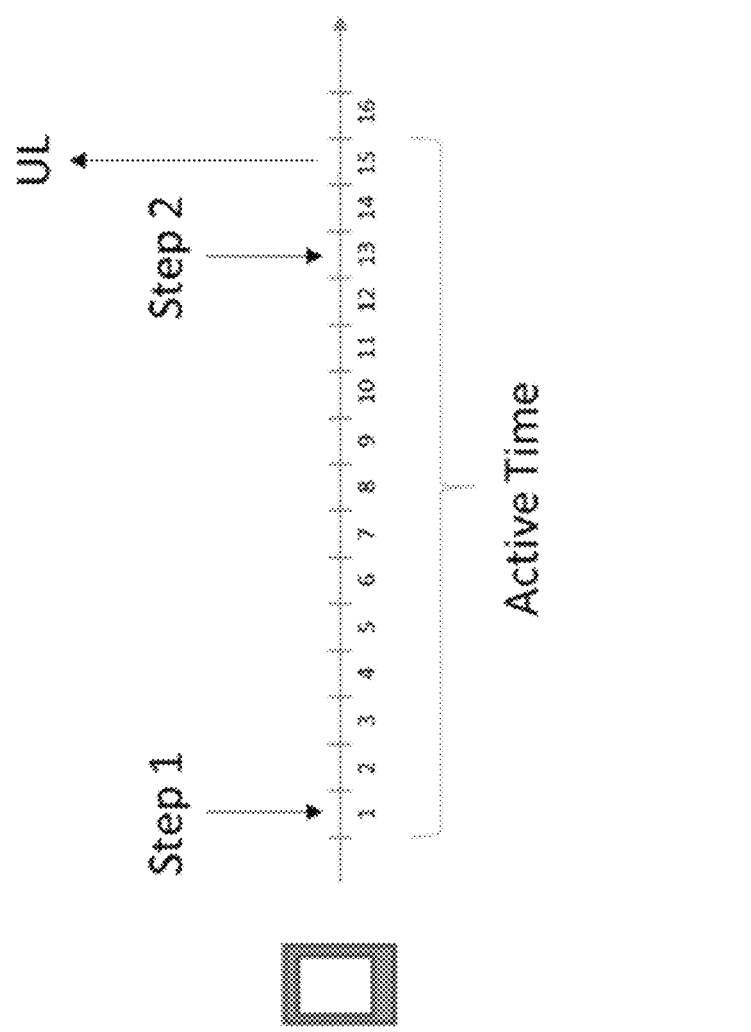
FIG. 9 illustrates a case where the UE is in Active Time from Step 1 until the uplink transmission triggered by Step 2, according to an exemplary embodiment.

Another possibility is that the UE is in Active Time until the associated uplink transmission is performed (the time of which may be indicated in the second trigger). FIG. 9 illustrates the scenario where the UE is in Active Time from Step 1 until the uplink transmission triggered by Step 2. In this case, the method 500 includes receiving the second trigger and exiting the state in response to transmitting an uplink transmission triggered by the second trigger.

When the UE is in Active Time from the first trigger, this may mean that the UE is in Active Time in response to reception of the first trigger. This may be the time when the UE receives/decodes the first trigger, e.g. in the same subframe, or it may be in the following subframe. Another possibility is that the UE will be in Active Time from a time T after the UE has received the first trigger. For example, entering Active Time may include waiting a predetermined period of time T after receiving the first trigger before entering Active Time. This is beneficial, for example, if some time is needed by the UE to decode the first trigger. That is, it may take some time for the UE to determine that the first trigger has been received and hence that the UE should be in Active Time. The time T may be specified in a specification, alternatively it could be signaled to the UE (e.g. using RRC/MAC/PDCCH signaling, etc.).

Figure 10:
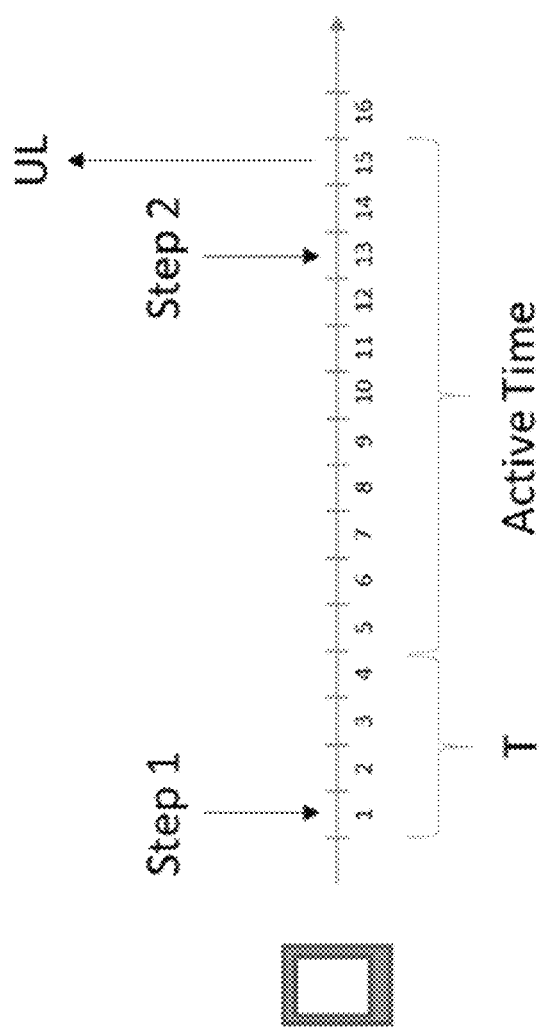
FIG. 10 illustrates a case where the UE is in Active Time from a time T after reception of Step 1 until the uplink transmission triggered by Step 2, according to an exemplary embodiment.
Figure 11:
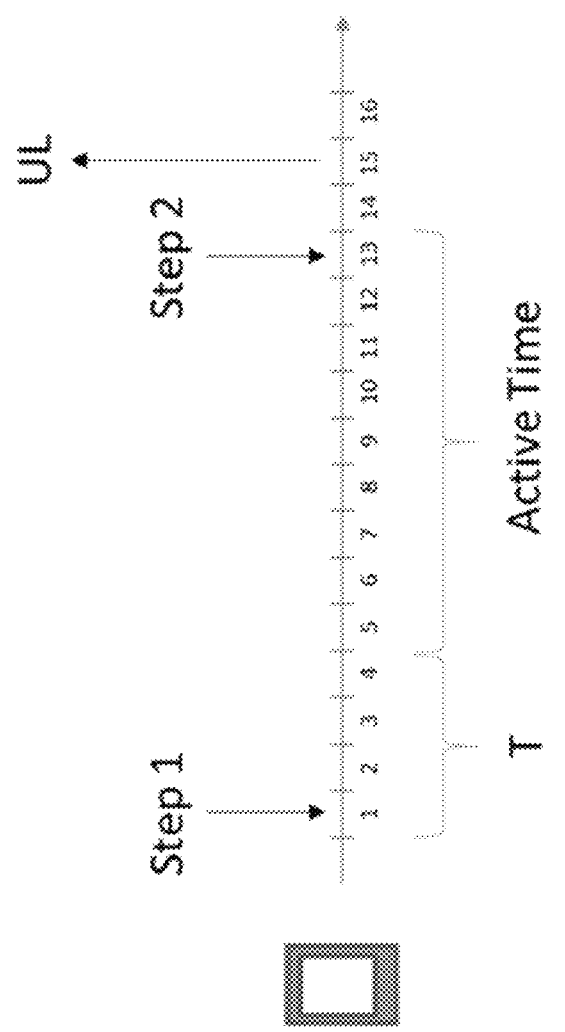
FIG. 11 illustrates a case where the UE is in Active Time from a time T after reception of Step 1 until the reception of Step 2, according to an exemplary embodiment.

Accordingly, FIG. 10 illustrates the scenario where the UE is in Active time from a time T after reception of Step 1 until the uplink transmission is triggered by Step 2. FIG.

11 illustrates the scenario where the UE is in Active time from a time T after reception of Step 1 until the reception of Step 2.

Inactivity Timer Handling with Two-Step Granting

Figure 12:
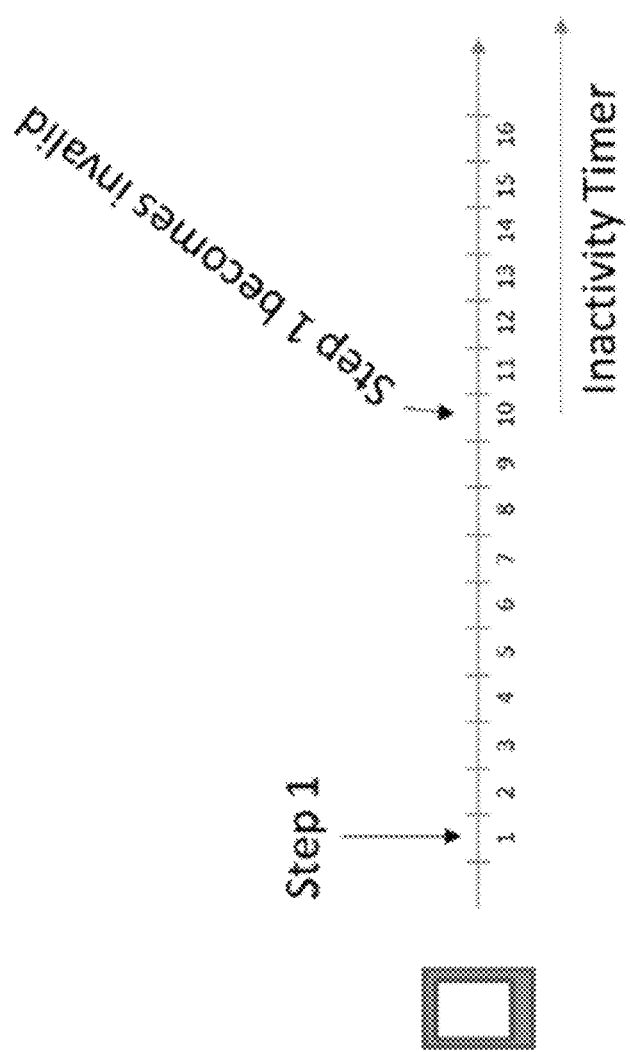
FIG. 12 illustrates the case when the UE starts an inactivity timer in response to Step 1 becoming invalid, according to an exemplary embodiment.

In one embodiment, the UE can start a timer in response to the first trigger becoming invalid or in response to the second trigger being received, and due to fact that this timer is running, the UE will be in Active Time. This timer may be a timer such as the DRX inactivity timer in LTE, for example. Therefore, the method 500 may include determining whether the first trigger became invalid. In response to determining that the first trigger became invalid, the method 500 then includes starting a timer and exiting the state only upon expiration of the timer. FIG. 12 illustrates the scenario where the UE starts a timer (inactivity timer) in response to Step 1 becoming invalid. The UE may therefore be in Active Time after Step 1 becomes invalid since the timer is running Below are examples of how such methods may be implemented in the LTE medium access control (MAC) specification.

Embodiment 1

According to one embodiment herein, the UE starts a timer in response to reception of the first trigger and the UE would be in Active Time when that timer is running. The duration of this timer may be the duration of the validity time of the first trigger. The duration may then be indicated to the UE in the first trigger. Another possibility is that the duration is configurable by the eNB, e.g., by use of RRC signaling.

When the timer is not running the UE would no longer be in Active Time (but as explained above, the UE may be in Active Time for other reasons). The timer may be stopped when the UE receives the second trigger. And if the timer expires, the timer would not be running any longer and hence the UE would not be in Active Time.

One possible example of how this can be implemented in the LTE MAC specification is provided below (3GPP TS 36.321 v13.2.0). The added words are shown with underlined text:

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured) and SL-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see subclause 7.7).

When a DRX cycle is configured, the Active Time includes the time while:
onDurationTimer or drx-InactivityTimer or drx-Retransmission Timer or drx-ULRetransmission Timer or mac-ContentionResolutionTimer (as described in subclause 5.1.5) <u>or twoStepGrantTimer</u> is running; or
a Scheduling Request is sent on PUCCH and is pending (as described in subclause 5.4.4); or
an uplink grant for a pending HARQ retransmission can occur and there is data in the corresponding HARQ buffer for synchronous HARQ process; or
a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
if a HARQ RTT Timer expires in this subframe:
if the data of the corresponding HARQ process was not successfully decoded:
start the drx-RetransmissionTimer for the corresponding HARQ process;
if NB-IoT, start or restart the drx-InactivityTimer.
if an UL HARQ RTT Timer expires in this subframe:
start the drx-ULRetransmission Timer for the corresponding HARQ process.
if NB-IoT, start or restart the drx-InactivityTimer.
if a DRX Command MAC control element or a Long DRX Command MAC control element is received:
stop onDurationTimer;
stop drx-InactivityTimer.
if drx-InactivityTimer expires or a DRX Command MAC control element is received in this subframe:
if the Short DRX cycle is configured:
start or restart drxShortCycleTimer;
use the Short DRX Cycle.
else:
use the Long DRX cycle.
if drxShortCycleTimer expires in this subframe:
use the Long DRX cycle.
if a Long DRX Command MAC control element is received:
stop drxShortCycleTimer;
use the Long DRX cycle.
If the Short DRX Cycle is used and [(SFN*10)+ subframe number] modulo (shortDRX-Cycle)= (drxStartOffset) modulo (shortDRX-Cycle); or
if the Long DRX Cycle is used and [(SFN*10)+ subframe number] modulo (longDRX-Cycle) =drxStartOffset:
start onDurationTimer.
during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:

monitor the PDCCH;
if the PDCCH indicates a DL transmission or if a DL assignment has been configured for this subframe:
if the UE is an NB-IoT UE, a BL UE or a UE in enhanced coverage:
start the HARQ RTT Timer for the corresponding HARQ process in the subframe containing the last repetition of the corresponding PDSCH reception;
else:
start the HARQ RTT Timer for the corresponding HARQ process;
stop the drx-RetransmissionTimer for the corresponding HARQ process.
if the PDCCH indicates an UL transmission for an asynchronous HARQ process:
start the UL HARQ RTT Timer for the corresponding HARQ process in the subframe containing the last repetition of the corresponding PUSCH transmission;
stop the drx-ULRetransmission Timer for the corresponding HARQ process.
if the PDCCH indicates a new transmission (DL, UL or SL):
except for NB-IoT, start or restart drx-InactivityTimer.
if the PDCCH indicates a PUSCH trigger A:
start or restart twoStepGrantTimer;
if the PDCCH indicates a PUSCH trigger B:
stop the twoStepGrantTimer;
if the PDCCH indicates a transmission (DL, UL) for a NB-IoT UE:
stop drx-InactivityTimer, drx-ULRetransmission Timer and onDurationTimer.
in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, type-0-triggered SRS [2] shall not be reported.
if CQI masking (cqi-Mask) is setup by upper layers:
in current subframe n, if onDurationTimer would not be running considering grants/assignments/DRX Command MAC control elements/Long DRX Command MAC control elements received until and including subframe n−5 when evaluating all DRX Active Time conditions as specified in this subclause, CQI/PMI/RI/PTI/CRI on PUCCH shall not be reported.

else:
in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, CQI/PMI/RI/PTI/CRI on PUCCH shall not be reported.

Regardless of whether the MAC entity is monitoring PDCCH or not, the MAC entity receives and transmits HARQ feedback and transmits type-1-triggered SRS [2] when such is expected.

NOTE: The same Active Time applies to all activated serving cell(s).

NOTE: In case of downlink spatial multiplexing, if a TB is received while the HARQ RTT Timer is running and the previous transmission of the same TB was received at least N subframes before the current subframe (where N corresponds to the HARQ RTT Timer), the MAC entity should process it and restart the HARQ RTT Timer.

NOTE: The BL UE and the UE in enhanced coverage waits until the last subframe of the configured MPDCCH search space before executing the next specified action.

Embodiment 2

According to another embodiment, a condition for considering the UE to be in Active Time can be added, and the condition is that while the UE shall be in active time (as described by the embodiments herein) when the conditions are being fulfilled.

An example of how this can be implemented in the LTE MAC specification is provided below (3GPP TS 36.321 v13.2.0). The added words are shown with underlined text in the alternative examples:

Alternative A

Section 5.7, labeled "Discontinuous Reception (DRX)" can be edited to state, in part:

When a DRX cycle is configured, the Active Time includes the time while:
onDurationTimer or drx-InactivityTimer or drx-RetransmissionTimer or drx-ULRetransmission Timer or mac-ContentionResolutionTimer (as described in subclause 5.1.5) or twoStepGrantTimer is running; or
a Scheduling Request is sent on PUCCH and is pending (as described in subclause 5.4.4); or
an uplink grant for a pending HARQ retransmission can occur and there is data in the corresponding HARQ buffer for synchronous HARQ process; or
a PDCCH indicating a new transmission addressed to the C-RNTI of the MAC entity has not been received after successful reception of a Random Access Response for the preamble not selected by the MAC entity (as described in subclause 5.1.4), or
a PUSCH trigger B has yet not been received for a valid PUSCH trigger A Alternative B:

In this alternative, Section 5.7 can be edited to state, in part (see underlined addition):

When a DRX cycle is configured, the Active Time includes the time while:

onDurationTimer or drx-InactivityTimer or drx-RetransmissionTimer or drx-ULRetransmissionTimer or mac-ContentionResolutionTimer (as described in subclause 5.1.5) is running; or
a Scheduling Request is sent on PUCCH and is pending (as described in subclause 5.4.4); or
an uplink grant for a pending HARQ retransmission can occur and there is data in the corresponding HARQ buffer for synchronous HARQ process; or
a PDCCH indicating a new transmission addressed to the C-RNTI of the MAC entity has not been received after successful reception of a Random Access Response for the preamble not selected by the MAC entity (as described in subclause 5.1.4), or
a PUSCH trigger B has yet not been received for a PDCCH trigger A and the PDCCH trigger A is still valid.

Alternative C:

According to another alternative, it can be shown that the UE will, upon reception of Step 2 or upon Step 1 becoming invalid, start the drx-InactivityTimer, which makes the UE enter Active Time.

Section 5.7, in this alternative, states, in part:

When a DRX cycle is configured, the Active Time includes the time while:
onDurationTimer or drx-InactivityTimer or drx-RetransmissionTimer or drx-ULRetransmissionTimer or mac-ContentionResolutionTimer (as described in subclause 5.1.5) or twoStepGrantTimer is running; or
a Scheduling Request is sent on PUCCH and is pending (as described in subclause 5.4.4); or
an uplink grant for a pending HARQ retransmission can occur and there is data in the corresponding HARQ buffer for synchronous HARQ process; or
a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
if a HARQ RTT Timer expires in this subframe:
    if the data of the corresponding HARQ process was not successfully decoded:
        start the drx-RetransmissionTimer for the corresponding HARQ process;
    if NB-IoT, start or restart the drx-InactivityTimer.
if an UL HARQ RTT Timer expires in this subframe:
    start the drx-ULRetransmission Timer for the corresponding HARQ process.
    if NB-IoT, start or restart the drx-InactivityTimer.
if a DRX Command MAC control element or a Long DRX Command MAC control element is received:
    stop onDurationTimer;
    stop drx-InactivityTimer.
if drx-InactivityTimer expires or a DRX Command MAC control element is received in this subframe:
    if the Short DRX cycle is configured:
        start or restart drxShortCycleTimer;
        use the Short DRX Cycle.
    else:
        use the Long DRX cycle.
    if drxShortCycleTimer expires in this subframe:
        use the Long DRX cycle.
    if a Long DRX Command MAC control element is received:
        stop drxShortCycleTimer;
        use the Long DRX cycle.
If the Short DRX Cycle is used and [(SFN*10)+ subframe number] modulo (shortDRX-Cycle)= (drxStartOffset) modulo (shortDRX-Cycle); or
if the Long DRX Cycle is used and [(SFN*10)+ subframe number] modulo (longDRX-Cycle) =drxStartOffset:
    start onDurationTimer.
during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or
during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
    monitor the PDCCH;
    if the PDCCH indicates a DL transmission or if a DL assignment has been configured for this subframe:
        if the UE is an NB-IoT UE, a BL UE or a UE in enhanced coverage:
            start the HARQ RTT Timer for the corresponding HARQ process in the subframe containing the last repetition of the corresponding PDSCH reception;
        else:
            start the HARQ RTT Timer for the corresponding HARQ process;
        stop the drx-RetransmissionTimer for the corresponding HARQ process.
    if the PDCCH indicates an UL transmission for an asynchronous HARQ process:
        start the UL HARQ RTT Timer for the corresponding HARQ process in the subframe containing the last repetition of the corresponding PUSCH transmission;
        stop the drx-ULRetransmissionTimer for the corresponding HARQ process.
    if the PDCCH indicates a new transmission (DL, UL or SL):
        except for NB-IoT, start or restart drx-InactivityTimer.
    if the PDCCH indicates a PUSCH trigger A:
        start or restart twoStepGrantTimer;

if the PDCCH indicates a PUSCH trigger B or the PUSCH trigger A becomes invalid:
  stop the twoStepGrantTimer;
  start or restart the drx-InactivityTimer;
if the PDCCH indicates a transmission (DL, UL) for a NB-IoT UE:
  stop drx-InactivityTimer, drx-ULRetransmissionTimer and onDurationTimer.
in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, type-0-triggered SRS [2] shall not be reported.
if CQI masking (cqi-Mask) is setup by upper layers:
  in current subframe n, if onDurationTimer would not be running considering grants/assignments/DRX Command MAC control elements/Long DRX Command MAC control elements received until and including subframe n−5 when evaluating all DRX Active Time conditions as specified in this subclause, CQI/PMI/RI/PTI/CRI on PUCCH shall not be reported.
else:
  in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, CQI/PMI/RI/PTI/CRI on PUCCH shall not be reported.
Regardless of whether the MAC entity is monitoring PDCCH or not, the MAC entity receives and transmits HARQ feedback and transmits type-1-triggered SRS [2] when such is expected.
NOTE: The same Active Time applies to all activated serving cell(s).
NOTE: In case of downlink spatial multiplexing, if a TB is received while the HARQ RTT Timer is running and the previous transmission of the same TB was received at least N subframes before the current subframe (where N corresponds to the HARQ RTT Timer), the MAC entity should process it and restart the HARQ RTT Timer.
NOTE: The BL UE and the UE in enhanced coverage waits until the last subframe of the configured MPDCCH search space before executing the next specified action.

Figure 13:
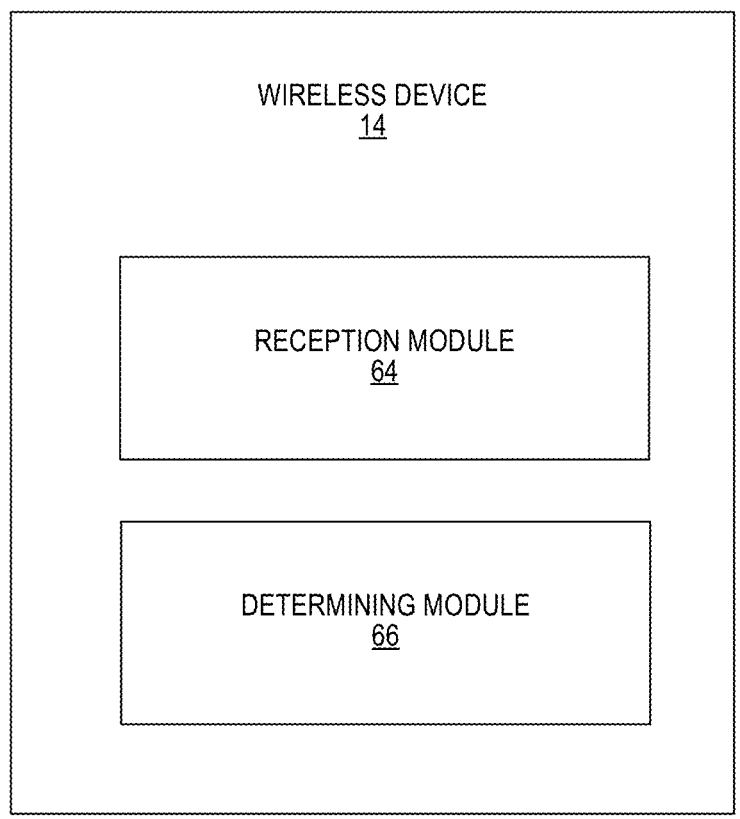
FIG. 13 is a diagram of a wireless device including modules according to some embodiments.

FIG. 13 is a diagram of a UE 14 including modules implemented in software that, when executed by a processor of the UE 14, causes the UE 14 to operate according to a DRX configuration and receive, from a wireless communications network, two-step grants for uplink transmissions. The implementation includes a determining module 66 for determining whether the UE 14 has received a first trigger of a two-step grant. The determining module 66 is also for causing the UE 14 to enter a state in which the UE 14 listens on a physical downlink control channel for messages from the network, in response to determining that the UE 14 has received the first trigger. The implementation may also include a reception module 64 for receiving the triggers.

Figure 14:
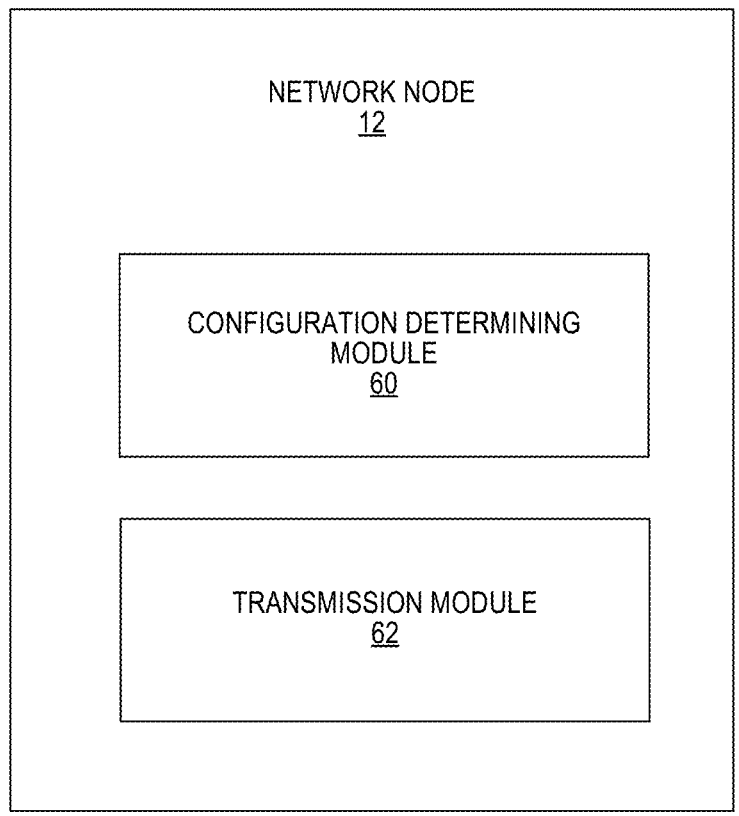
FIG. 14 is a diagram of a network node including modules according to some embodiments.

FIG. 14 is a diagram of a network node 12 including modules implemented in software that, when executed by a processor of the network node 12, causes the network node 12 to provide, to a wireless communications device operating according to a DRX configuration, two-step grants for uplink transmissions. The implementation includes a transmission module 62 for transmitting a first trigger of the two-step grant and for, prior to transmitting a second trigger of the two-step grant, transmitting physical downlink control channel messages to the device to be received during a state in which the device listens on a physical downlink control channel for messages from the network. The implementation also includes a configuration determining module 60 for determining the DRX configuration of the wireless device.

Of course, various modules of hardware and software elements, alone or combination, could be used to perform the steps described herein. Further, any or all functions could be performed by one or more nodes, such as in a cloud or other network node.

Those skilled in the art will recognize improvements and modifications to the embodiments of the present disclosure. All such improvements and modifications are considered within the scope of the concepts disclosed herein.

What is claimed is:

1. A method performed by a wireless communications device operating according to a Discontinuous Reception (DRX) configuration and configured to receive, from a wireless communications network, two-step grants for uplink transmissions, the method comprising:
  while in a DRX active state, determining whether the device has received a first trigger of a two-step grant;
  remaining in the state in which the device listens on a physical downlink control channel for messages from the network, in response to determining that the device has received the first trigger of the two-step grant;
  determining whether the device has received a second trigger of the two-step grant; and
  in response to determining that the device has received the second trigger, exiting the state.

2. The method according to claim 1, wherein entering the state comprises waiting a predetermined period of time after receiving the first trigger before exiting the state.

3. The method according to claim 1, further comprising:
  determining whether the first trigger became invalid; and
  in response to determining that the first trigger became invalid, exiting the state.

4. The method according to claim 1, further comprising:
  starting a timer in response to receiving the first trigger; and
  exiting the state only upon expiration of the timer.

5. The method according to claim 1, further comprising:
  determining whether the first trigger became invalid;
  in response to determining that the first trigger became invalid, starting a timer; and
  exiting the state only upon expiration of the timer.

6. The method according to claim 4, wherein a duration of the timer is received with the first trigger.

7. The method according to claim 4, wherein a duration of the timer is received in Radio Resource Control (RRC) signaling.

8. The method according to claim 4, further comprising stopping the timer in response to receiving a second trigger of the two-step grant.

9. The method according to claim 4, wherein exiting the state only upon expiration of the timer comprises exiting the state before a second trigger of the two-step grant has been received.

10. The method according to claim 1, further comprising:
    determining whether the device has received a second trigger of the two-step grant;
    in response to determining that the device has received the second trigger, determining whether a particular timer is running; and
    in response to determining that the timer is running, exiting the state only after expiration of the timer.

11. The method according to claim 1, further comprising:
    receiving a second trigger of the two-step grant; and
    exiting the state in response to transmitting an uplink transmission triggered by the second trigger.

12. The method according to claim 8, wherein a time in which the device is in the state includes the transmission timing interval (TTI) in which the second trigger was received.

13. The method according to claim 1, wherein a time in which the device is in the state includes the transmission timing interval (TTI) in which the first trigger was received.

14. A wireless communications device configured to operate according to a Discontinuous Reception (DRX) configuration and configured to receive, from a wireless communications network, two-step grants for uplink transmissions, the device comprising:
    transceiver circuitry configured for communication with the network; and
    processing circuitry operatively associated with the transceiver circuitry and configured to:
        determine, while in a first DRX state, whether the device has received a first trigger of a two-step grant;
        cause the device to remain in the first DRX state in which the device listens on a physical downlink control channel for messages from the network to allow reception of a second trigger of the two-step grant, in response to determining that the device has received the first trigger;
        determine whether the device has received a second trigger of the two-step grant; and
        in response to determining that the device has received the second trigger, exit the state.

15. The device according to claim 14, wherein the processing circuitry is configured to wait a predetermined period of time after receiving the first trigger before causing the device to enter a second DRX state in which the device does not listen on a physical downlink control channel for messages from the network.

16. The device according to claim 14, wherein the processing circuitry is configured to:
    determine whether the first trigger became invalid; and
    in response to determining that the first trigger became invalid, cause the device to exit the first DRX state.

17. The device according to claim 14, wherein the processing circuitry is configured to:
    start a timer in response to receiving the first trigger; and
    cause the device to exit the first DRX state only upon expiration of the timer.

18. The device according to claim 14, wherein the processing circuitry is configured to:
    determine whether the first trigger became invalid;
    in response to determining that the first trigger became invalid, start a timer; and
    cause the device to exit the first DRX state only upon expiration of the timer.

19. The device according to claim 17, wherein a duration of the timer is received with the first trigger.

20. A method performed by a wireless communications device operating according to a Discontinuous Reception (DRX) configuration and configured to receive, from a wireless communications network, two-step grants for uplink transmissions, the method comprising:
    while in a DRX active state, determining whether the device has received a first trigger of a two-step grant;
    remaining in the state in which the device listens on a physical downlink control channel for messages from the network, in response to determining that the device has received the first trigger of the two-step grant;
    starting a timer in response to receiving the first trigger; and
    exiting the state only upon expiration of the timer, wherein exiting the state only upon expiration of the timer comprises exiting the state before a second trigger of the two-step grant has been received.

* * * * *